Harvey Keith McQuarrie
Gerald Eugene Bechtel
INVENTORS

BY

Peter W. McBurney
Agent

May 10, 1966 H. K. McQUARRIE ETAL 3,250,585

COMBINATION TORSION BAR-HINGE PIN FOR AN ENCLOSURE HAVING A LID

Filed June 19, 1964 3 Sheets-Sheet 2

INVENTORS
HARVEY KEITH McQUARRIE
GERALD EUGENE BECHTEL
BY

AGENT

May 10, 1966 H. K. McQUARRIE ETAL 3,250,585

COMBINATION TORSION BAR-HINGE PIN FOR AN ENCLOSURE HAVING A LID

Filed June 19, 1964 3 Sheets-Sheet 3

Harvey Keith McQuarrie
Gerald Eugene Bechtel
INVENTORS

BY [signature]

Agent

United States Patent Office 3,250,585

Patented May 10, 1966

3,250,585

COMBINATION TORSION BAR-HINGE PIN FOR AN ENCLOSURE HAVING A LID

Harvey K. McQuarrie and Gerald E. Bechtel, both of Kitchener, Ontario, Canada, assignor to Dominion Electrohome Industries Limited, Kitchener, Ontario, Canada Filed June 19, 1964, Ser. No. 376,364

10 Claims. (Cl. 312—319)

This invention relates to devices for automatically opening lids of enclosures. More particularly, this invention relates to a combination torsion bar-hinge pin for lids of enclosures.

Apparatus embodying this invention, because of certain of its features, is particularly suited for use with a cabinet containing sound reproducing equipment such as a record changer or turntable, where it is important that vibration or jarring of this equipment be kept to a minimum. However, while this invention will be hereinafter described in connection with a cabinet for "hi-fi" equipment, those skilled in the art will appreciate that apparatus embodying this invention may be used in connection with lids for enclosures generally.

It is, of course, common practice to employ hinges for hinging lids on an enclosure. It also is common practice to employ torsion bars for lifting the lids of enclosures.

In accordance with this invention, however, there is provided, for an enclosure with a lid, a combination torsion bar-hinge pin.

In a cabinet for "hi-fi" equipment it is desirable to provide a lid which will open and close smoothly, with a force being exerted against the lid during closing, so as to minimize vibration or jarring of a record changer or turntable in the cabinet, thereby avoiding causing the needle of the record player to jump from one groove to another of a record being played with consequent damage to the record and discontinuity in the selection being reproduced. While such a lid movement could be achieved by the use of spring biased hinges of known type, the use of such hinges is subject to the disadvantage that many different types of hinges (different in the sense of the size and strength of the springs employed) must be kept available for use with lids of different sizes and weights.

In accordance with a preferred embodiment of this invention there is provided, for an enclosure with a lid, a combination torsion bar-hinge pin with means to adjust the torsional force capable of being exerted of the torsion bar.

While devices such as springs or torsion bars have been used in the past for lifting lids, it has been common practice to employ some form of mechanical stop on the enclosure against which stop the lid abuts when moved to its open position. This is undesirable in a "hi-fi" cabinet on account of the possible jarring of a record player in the cabinet, as aforementioned.

In accordance with a preferred embodiment of this invention there is provided an enclosure with a lid which is automatically raised, when a latch is released, by a combination torsion bar-hinge pin designed in such a manner that the lid is brought to rest in an open position without abutting any form of stop means.

In accordance with another preferred embodiment of this invention there is provided apparatus of the foregoing type having incorporated therein a latch designed in such a manner that when the lid of the enclosure is moved from the closed position of the lid inwardly towards the enclosure, the latch automatically releases the lid to permit the same to be opened by the torsion bar.

In accordance with the broad concept of this invention there is provided an enclosure having an open end and a lid for closing such open end but movable to an open position. Hinge means hingedly connect the lid to the enclosure, and there are means provided for holding the lid in closed position over the open end of the enclosure. The aforementioned hinge means comprise knuckles secured to the lid and enclosure respectively and a hinge pin extending through the knuckles. The hinge pin is a torsion bar that is secured to the lid and enclosure at spaced apart points so as to permit twisting of the torsion bar when the lid is moved from its open to its closed position. The torsion bar is sufficiently twisted in the closed position of the lid to open the lid when the lid is released.

This invention will become more apparent from the following detailed description, taken in conjunction with the appended drawings, in which.

Figures 1, 2:
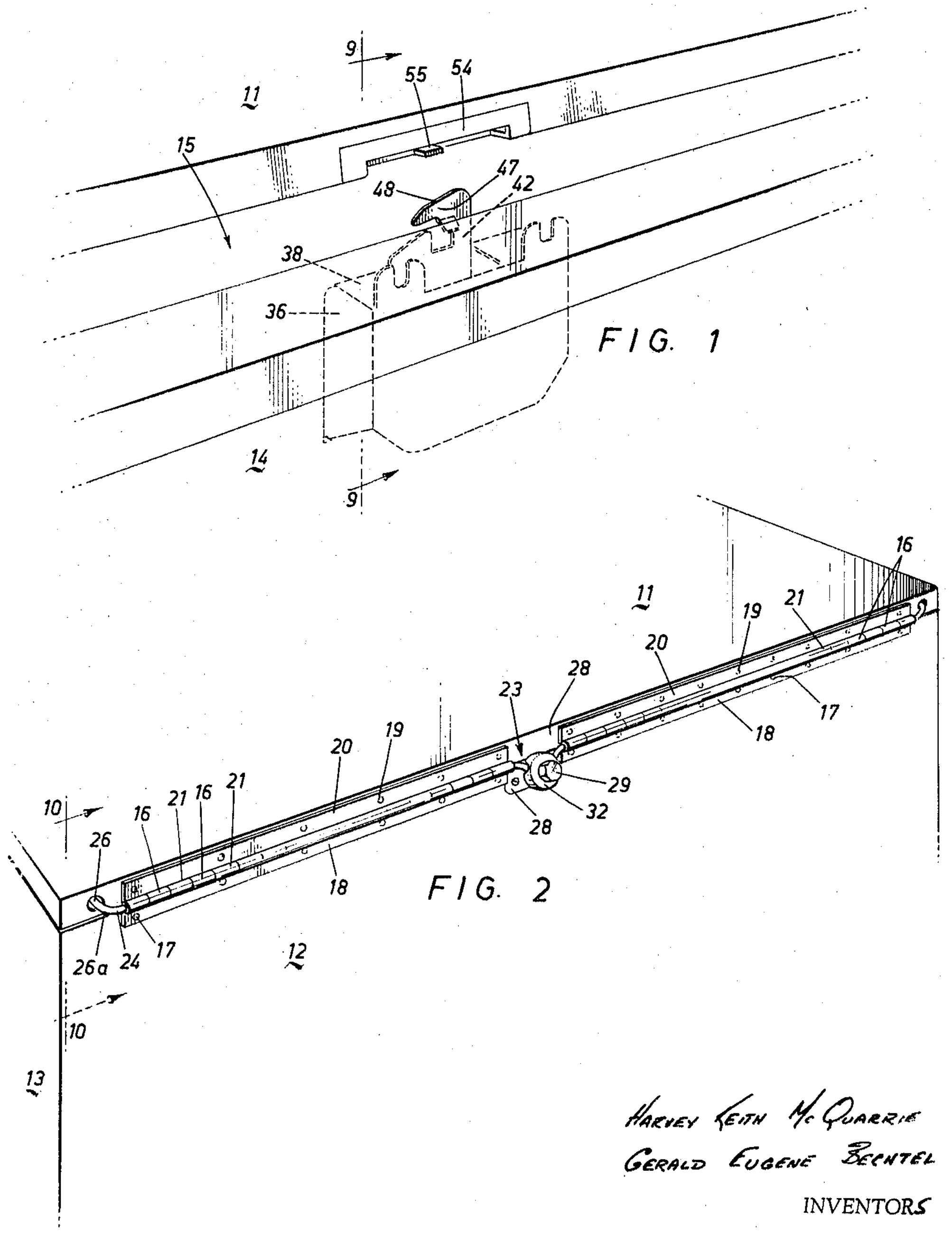
FIGURE 1 is a perspective view showing a part of the front wall and lid of the cabinet of a "hi-fi" set.
FIGURE 2 is a perspective view showing a part of the lid, one side wall, and the back wall of the cabinet of FIGURE 1.
Figure 3:
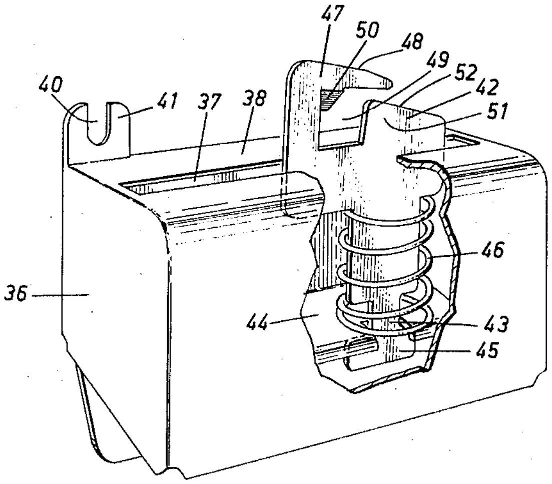
FIGURE 3 is a perspective view, partly broken away, showing the catch part of a latch which may be used with the cabinet of FIGURES 1 and 2.
Figure 7:
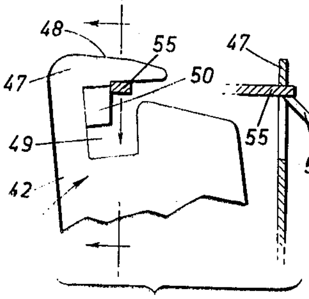
Figure 8:
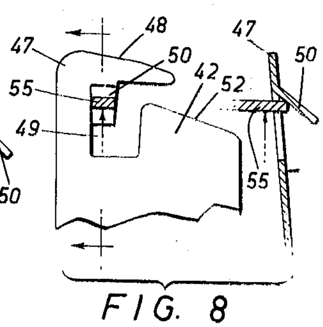
Figure 9:
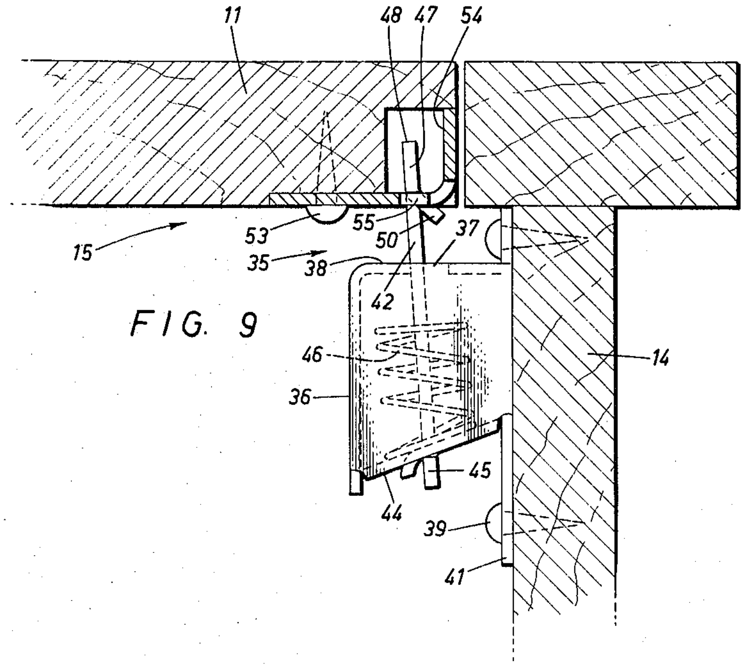
Figures 10, 11:
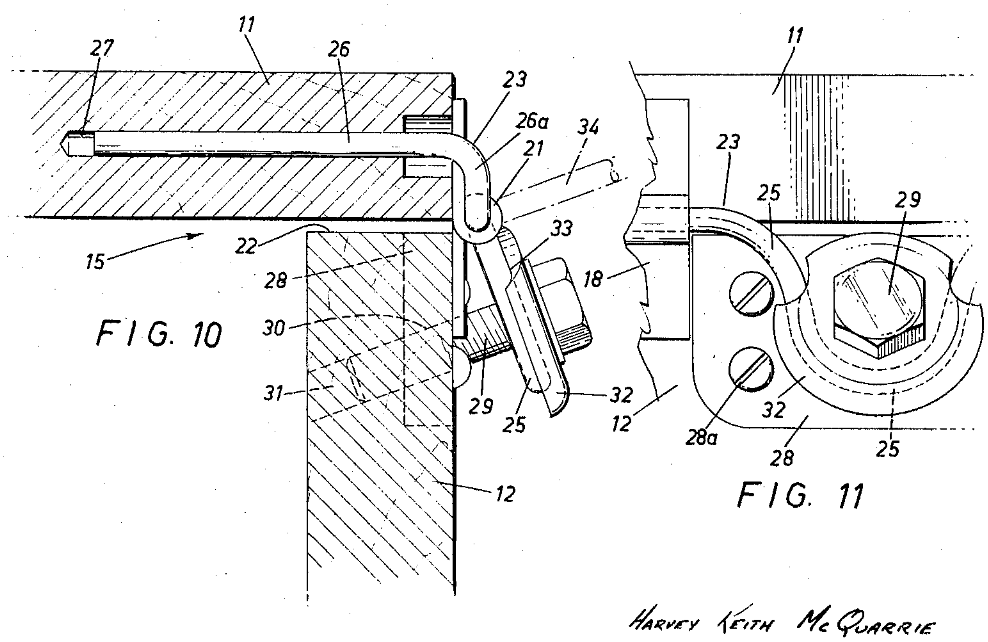

FIGURES 4–8 inclusive disclose the mode of operation of the catch of FIGURE 3, FIGURES 7 and 8 showing the catch both in front elevation and in side section;

FIGURE 9 is a section taken along line 9—9 in FIGURE 1 with the lid in closed position;

FIGURE 10 is a section taken along line 10—10 in FIGURE 2; and

FIGURE 11 is a rear elevation showing a part of FIGURE 2 in greater detail.

Referring to FIGURES 2, 10 and 11, there is shown the lid 11 and back wall 12 of a cabinet for "hi-fi" equipment. Back wall 12 together with side walls 13 (FIGURE 2, only one shown) and front wall 14 (FIGURE 9) define an enclosure or cabinet having an open top end 15 and which contains sound reproducing equipment (not shown).

Secured to back wall 12 on both sides of the vertical centreline thereof are knuckles 16, these knuckles 16 being secured to back wall 12 by means of screws 17 screwed into back wall 12 through apertures in a plate 18 on which knuckles 16 are integrally formed. Fixed to lid 11 along the back edge thereof and on both sides of the vertical centreline of back wall 12 by means of screws 19 are plates 20 which have knuckles 21 formed integral therewith. It will be seen that knuckles 21 are positioned between adjacent knuckles 16 so that the openings defined by the knuckles lie in the same straight line. As best shown in FIGURE 10, with knuckles 16 and 21 so aligned, lid 11 is spaced slightly above the top edge 22 of back wall 12.

The hinge pin for knuckles 16 and 21 is formed by a torsion bar 23. Torsion bar 23 is in the form of a rod having two aligned straight portions 24, which pass through knuckles 16 and 21, separated by a generally U-shaped bend 25 with each straight portion 24 having an end 26 bent away therefrom substantially at right angles to the straight portion and connected to its straight portion by an inclined part 26a.

The ends 26 of torsion bar 23 are secured to lid 11 by being inserted into openings 27 formed in lid 11, as best shown in FIGURE 10. Straight portions 24 pass through knuckles 16 and 21 on both sides of U-shaped bend 25.

Means are provided for securing torsion bar 23 to the enclosure or cabinet. These means consist of a plate 28 which is screwed by screws 28a into a recess provided in back wall 12, a bolt 29 which is threadably engageable with the side walls of an inclined opening 30 in plate 28 and which is movable into an opening 31 in back wall 12 in alignment with opening 30, and a generally circular plate 32 mounted on bolt 29 and provided with a groove 33 therein into which U-shaped bend 25 fits. It will be noted that bolt 29 is located along the vertical centreline of back wall 12.

When no restraint is placed upon U-shaped bend 25, i.e. when torsion bar 23 is not secured to back wall 12, the position assumed by U-shaped bend 25 is shown by the dotted lines at 34 in FIGURE 10. In order to impart a twist to the straight portions 24 of torsion bar 23 which pass through knuckles 16 and 21 and on which knuckles 21 rotate, U-shaped bend 25 is moved from position 34 to the position thereof shown in solid outlines in FIGURE 10. It is important to note that the degree of twist in straight portions 24 may be varied by the simple expedient of threading bolt 29 into opening 30 to increase the torsional force and threading bolt 29 out of opening 30 to decrease the torsional force. In this manner the combination torsion bar-hinge pin 23 can be adjusted to open lids 11 of varying size and weight.

Turning now to FIGURES 1, 3 and 9, there is shown a latch 35 which may be employed in the cabinet. Mounted on the inside surface of front wall 14 adjacent the top edge thereof and at the centre of front wall 14 is a housing 36 which has a slot 37 in its top wall 38, housing 36 being fastened to front wall 14 by screws 39 and being adjustable to some extent on front wall 14 by virtue of the provision of elongated slots 40 through which screws 39 pass and which are provided in tabs 41 formed integral with housing 36.

Positioned in housing 36 and extending out of the housing through slot 37 is a catch 42. Catch 42 has a neck 43 which passes through an opening in the bottom wall 44 of housing 36 and which is both wider and longer than neck 43 so that catch 42 is permitted to move in two mutually perpendicular planes, i.e. transversely across slot 37 and from end to end in slot 37. Catch 42 is retained in housing 36 by an enlarged flanged end 45 positioned beneath bottom wall 44 and is biased by means of a spring 46 so that a part of catch 42 thereof projects through slot 37.

The part of catch 42 projecting out of slot 37 includes a finger 47 having an inclined edge 48. Beneath finger 47 is a generally rectangular opening 49. Positioned at the upper lefthand (FIGURES 3–8) corner of this opening is another finger 50 which is inclined with respect to finger 47. To the right (FIGURES 3–8) of opening 49 and beneath finger 47 is a projection 51 having an inclined edge 52.

Mounted on lid 11 at the centre and along the lower front edge thereof by means of screws 53 is the other part of latch 35, namely a plate 54 which carries a catch-engaging finger 55.

Figure 4:
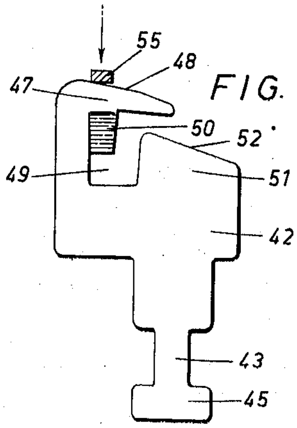
Figure 5:
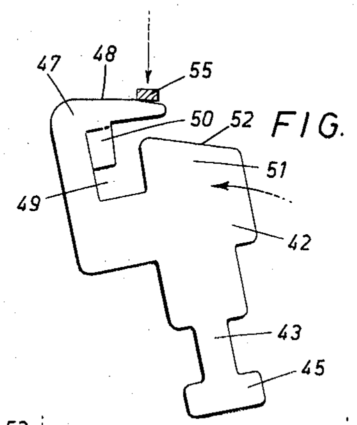
Figure 6:
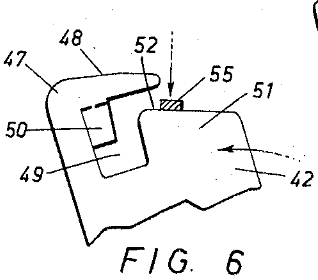

The operation of latch 35 is best shown in FIGURES 4–8 inclusive. FIGURES 4–7 inclusive show how the latch is actuated to hold lid 11 in closed position. Referring to FIGURE 4, as lid 11 is closed, catch-engaging finger 55 moves in the direction shown by the arrow and strikes catch 42 at edge 48 directly above finger 50, catch 42 standing vertical under the influence of spring 46 at this particular point. When movement of lid 11 is continued in the direction of the arrow in FIGURE 4, catch 42 moves sideways in slot 37, because of the inclination of edge 48, and through the position of FIGURE 5 to the position of FIGURE 6. When catch 42 is in the position of FIGURE 6, lid 11 is below its normally closed position, which is the position of the lid shown in FIGURE 9. However, when the force closing lid 11 is released, torsion bar 23 moves lid 11 upwardly, which then permits catch 42 to move, under the influence of spring 46, in slot 37 to the position shown in FIGURE 7 where catch-engaging finger 55 is caught under finger 47. Lid 11 now is securely locked in closed position.

In order to release lid 11 it is pushed inwardly towards the enclosure, so that catch-engaging finger 55 moves in the direction shown by the arrow in FIGURE 7. When catch-engaging finger 55 is moved below finger 50, catch 42 moves, under the bias of spring 46, to its vertical position, as shown in FIGURE 8. This places finger 50 directly over catch-engaging finger 55, so that when the force which was used to move lid 11 downwardly is released, catch-engaging finger 55 slides up the inclined face of finger 50 pushing catch 42 rearwardly in slot 37, whereby the lid is released.

It will be seen from the foregoing that latch 35 is of a type which is actuable to release lid 11 simply by virtue of the movement of lid 11 from its closed position (FIGURE 9) inwardly towards the enclosure on which the lid is mounted.

In order to mount lid 11 on the cabinet or enclosure, hinge plates 18 and 20 with the straight portions 24 of torsion bar 23 passing therethrough are secured to back wall 12 and lid 11 in the position shown in FIGURE 2, and bent ends 26 of torsion bar 23 are inserted into openings 27. U-shaped bend 25 then is twisted through an angle of about 90° from position 34 (FIGURE 10) to the position thereof shown in solid outlines in FIGURE 10, and bolts 29 with plate 32 thereon is threaded into opening 30 until these components are arranged as shown in FIGURE 10. Bolt 29 then may be adjusted to vary the torsional force in torsion bar 23 to enable the torsion bar to lift lid 11 to its desired inclination. It is generally desirable for lid 11 to be lifted through an angle of from about 75° to 85° from the horizontal position thereof shown in FIGURE 10. As aforementioned, bolt 29 may be threaded into or out of opening 30 to increase or decrease the degree of twist in straight portions 24 so as to increase or decrease the angle through which lid 11 is lifted. In any event, with the construction illustrated lid 11 will be lifted through an angle of less than 90°.

It is important to note that the degree of twist in torsion bar 23 is adjusted so that the forces acting against the torsional force tending to lift lid 11, namely the weight of the lid and the friction in the hinge, are sufficient to stop upward movement of lid 11 about the hinge axis of the hinge before the lid engages any form of stop means. The torsional force exerted by torsion bar 23 and the frictional forces in the hinge are the only forces supporting lid 11 when it is at rest in its open position.

In order to provide the necessary torque for opening lid 11 the desired amount from a horizontal position, it has been found that torsion bar 23 should be capable of exerting a torque which is about 1.4 times as large as the closing moment of lid 11, i.e. the weight of lid 11 multiplied by the distance between the hinge axis and the centre of gravity of lid 11 measured along lid 11.

It will be seen from the foregoing that there has been provided a combination torsion bar-hinge pin which is capable of automatically lifting lid 11 smoothly to a predetermined position, and which operates in such a manner that lid 11 is brought to a smooth stop without engaging any form of stop on the enclosure, so as to avoid jarring of a record player in the enclosure. Of course it will be appreciated that a stop may be provided on the enclosure or associated with the hinge to limit the amount that the lid can be opened but which is not normally engaged by lid 11. Thus, for example, a stop may be provided to prevent the lid from being opened more than 90° from its closed position, but as the lid normally is lifted only in an arc of from 75° to 85° by the torsion bar, lid 11 will not normally strike this stop. In addition, there has been provided a latch for such apparatus which is completely hidden from view when the lid is closed, and which only requires the lid to be pushed inwardly towards the enclosure from the closed position of the lid in order to release the lid for automatic smooth opening thereof. It also will be seen that closing of lid 11 is effected against the action of torsion bar 23. This prevents lid 11 from falling from its open position to a closed position and thereby jarring equipment in the cabinet.

As exemplary only of this invention, torsion bar 23 may be constructed from music wire AS5A having a natural black phosphate coating thereon and a minimum ultimate strength of 286,000 p.s.i. (.125" diameter).

The following Table I gives particulars of torsion bars which have been found useful in practising this invention and which have been fabricated from AS5A music wire. The first column in this table gives the designation number of the torsion bar. The second column gives the maximum nominal torque in lbs.-in. The column headed A designates the wire diameter in inches. The column headed B designates the length of the torsion bar measured from centreline to centreline of bent ends 26. The column headed C designates the length of straight portions 24 of the torsion bar. Each of these torsion bars is characterized by a .625 inch radius at the ends of the straight portions 24 remote from U-shaped bend 25, a .375 inch radius at the ends of bent parts 26 projecting out of openings 27, a 40° angle between each straight portion 24 and the centreline of its respective bent end 26, i.e. parts 26*a* inclined at 40° to the horizontal, and each torsion bar is characterized by having a U-shaped bend 25 having the centre of curvature of its bight ½ inch below the centreline of straight portions 24, a radius of curvature of .375 inch for its bight and .625 inch radius curves joining U-shaped bend 25 to straight portions 24, the distance from the centre of curvature of the bight of U-shaped bend 25 to each straight portion 24 measured along the axis of the straight portions being 1 inch.

*Table I*

| Designation | Max. nom. torque, lb.-in. | A | B | C |
|---|---|---|---|---|
| S2 | 72.2 | .125 | 25.62 | 11.1 |
| S3 | 67.2 | .125 | 27.62 | 12.1 |
| S4 | 52.8 | .118 | 27.62 | 12.1 |
| S5 | 61.8 | .118 | 23.87 | 10.2 |

The following Table II gives an indication of lids of various different sizes and weights and indicates which spring from Table I should be employed for best results. The first three columns in Table II give the length, width and thickness of lid 11; the fourth column gives the area of lid 11; the fifth column gives the volume density of lid 11; the sixth column gives the area density of lid 11; the seventh column gives the weight of lid 11; the eighth column gives the moment arm of lid 11 (the shortest distance from the hingle axis to the centre of gravity of lid 11 measured along lid 11); the ninth column gives the closing moment of lid 11 and represents the products of the figures given in columns 7 and 8; the tenth column indicates the opening moment which is required (1.4 times the closing moment) and the last column indicates which torsion bar of Table I should be employed. It should be noted that in calculating the moment arm in column 8 it is assumed that the hinge axis is ⅛ inch behind back wall 12.

While preferred embodiments of this invention have been disclosed herein, those skilled in the art will appreciate that changes and modifications may be made therein without departing from the spirit and scope of this invention as defined in the appended claims.

What we claim as our invention is:

1. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid against the force of gravity when said means for holding said lid are released, said hinge pin being secured to said enclosure by means that at least include means for varying the degree of twist in said hinge pin itself in said closed position of said lid, said hinge pin being a rod having two aligned straight portions separated by a generally U-shaped bend and each having an end bent away from its respective straight portion, sets of said first and second knuckle means being secured to said lid and to said enclosure respectively on opposite sides of said generally U-shaped bend, said straight portions each passing through a different one of said sets of said first and second knuckle means, said rod being secured to said enclosure at said generally U-shaped bend and being secured to said lid by having said bent ends of said rod inserted in openings in said lid.

2. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid against the force of gravity when said means for holding said lid are re-

*Table II*

| Lid size (in.) | | | Area (in.²) | Volume density (lb./in.³) | Area density (lb./in.²) | Weight (lb.) | Moment arm (in.) | Closing moment (lb./in.) | Opening moment (lb./in.) | Torsion bar |
|---|---|---|---|---|---|---|---|---|---|---|
| Length | Width | Thickness | | | | | | | | |
| 34⅛ | 13⅝ | ¾ | 466 | .0164 | .0123 | 5.74 | 6.94 | 39.8 | 55.8 | S5 |
| 33 13/16 | 14 13/16 | 13/16 | 501 | .0164 | .01331 | 6.69 | 7.53 | 50.2 | 70.2 | S2 |
| 32⅛ | 14⅞ | ⅞ | 479 | .0164 | .01436 | 6.89 | 7.56 | 51.9 | 72.6 | S2 |
| 34 7/16 | 15 3/16 | ¾ | 521 | .0164 | .0123 | 6.42 | 7.72 | 49.6 | 69.6 | S2 |
| 32½ | 15¼ | ¾ | 495 | .0164 | .0123 | 6.09 | 7.75 | 47.1 | 66.0 | S3 |

leased, said hinge pin being a rod having two aligned straight portions separated by a generally U-shaped bend, sets of said first and second knuckle means being secured to said lid and said enclosure respectively on opposite sides of said generally U-shaped bend, said straight portions each passing through a different one of said sets of said first and second knuckle means, said rod being secured to said enclosure by means comprising a plate engageable with said generally U-shaped bend, and means carrying said plate and mounted on said enclosure for movement of said plate and said generally U-shaped bend towards and away from said enclosure.

3. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficently twisted in said closed position of said lid to lift said lid against the force of gravity when said means for holding said lid are released, said hinge pin being a rod having two aligned straight portions separated by a generally U-shaped bend and each having an end bent away from its respective straight portion, sets of said first and second knuckle means being secured to said lid and said enclosure respectively on opposite sides of said generally U-shaped bend, said straight portions each passing through a different one of said sets of said first and second knuckle means, said rod being secured to said enclosure at said generally U-shaped bend and being secured to said lid by having said bent ends of said rod inserted in openings in said lid, said rod being secured to said enclosure by means comprising a plate engageable with said generally U-shaped bend, and means carrying said plate and mounted on said enclosure for movement of said plate and said generally U-shaped bend towards and away from said enclosure.

4. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid against the force of gravity when said means for holding said lid are released, said hinge pin being a rod having two aligned straight portions separated by a generally U-shaped bend and each having an end bent away from its respective straight portion, sets of said first and second knuckle means being secured to said lid and said enclosure respectively on opposite sides of said generally U-shaped bend, said straight portions each passing through a different one of said sets of said first and second knuckle means, said rod being secured to said lid by having said bent ends of said rod inserted in openings in said lid, said rod being secured to said enclosure by means comprising a plate engageable with said generally U-shaped bend, and means carrying said plate and mounted on said enclosure for movement of said plate and said generally U-shaped bend towards and away from said enclosure, the torsional force exerted by said hinge pin itself being sufficient to lift said lid only through an angle of less than 90° from said closed position of said lid, the forces acting against the torsional force being sufficient to stop upward movement of said lid above said hinge axis before said lid engages any form of stop means, and wherein the torsional force exerted by said hinge pin itself and the frictional forces in said hinge means are the only forces supporting said lid when said lid is at rest in said open position thereof.

5. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid against the force of gravity when said means for holding said lid are released, said means for holding said lid in said closed position thereof comprising a latch means, said latch means being actuable to release said lid by movement of said lid from said closed position thereof inwardly towards said enclosure, said latch means comprising a catch mounted on said enclosure for movement in two substantially perpendicular planes, and a catch-engaging finger carried by said lid.

6. In combination, an enclosure having an open top end, a lid for closing the open end of said enclosure and movable to an open position means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotally mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid aganst the force of gravity when said means for holding said lid are released, said means for holding said lid in said closed position thereof comprising a latch means, said latch means being actuable to release said lid by movement of said lid from said closed position thereof inwardly towards said enclosure, said hinge pin being a rod having two aligned straight portions separated by a generally U-shaped bend and each having an end bent away from its respective straight portion, sets of said first and second knuckle means being secured to said lid and said enclosure respectively on opposite sides of said generally U-shaped bend, said straight portions each passing through a different one of said sets of said first and second knuckle means, said rod being secured to said enclosure at said generally U-shaped bend and being sesured to said lid by having said bent ends of said rod inserted in openings in said lid, said rod being secured to said enclosure by means comprising a plate engageable with said generally U-shaped bend, and means carrying said plate and mounted on said enclosure for movement of said plate and said generally U-shaped bend towards and away from said enclosure; the torsional force exerted by said hinge pin itself being sufficient to lift said lid only through an angle of less than 90° from said closed position of said lid, the forces acting against said torsional force being sufficient to stop upward movement of said lid about said hinge axis before said lid engages any form of stop means; the torsional force exerted by said hinge pin itself and the frictional forces in said hinge means being the only forces supporting said lid when said lid is at rest in said open position thereof.

7. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid against the force of gravity when said means for holding said lid are released, said means for holding said lid in said closed position thereof comprising a latch means, said latch means being actuable to release said lid by movement of said lid from said closed position thereof inwardly towards said enclosure, said latch means comprising a catch mounted on said enclosure for movement in two substantially perpendicular planes, and a catch-engaging finger carried by said lid; said hinge pin being a rod having two aligned straight portions separated by a generally U-shaped bend and each having an end bent away from its respective straight portion, sets of said first and second knuckle means being secured to said lid and said enclosure respectively on opposite sides of said generally U-shaped bend, said straight portions each passing through a different one of said sets of said first and second knuckle means, said rod being secured to said enclosure at said generally U-shaped bend and being secured to said lid by having said bent ends of said rod inserted in openings in said lid, said rod being secured to said enclosure by means comprising a plate engageable with said generally U-shaped bend, and means carrying said plate and mounted on said enclosure for movement of said plate and said generally U-shaped bend towards and away from said enclosure.

8. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotally mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid against the force of gravity when said means for holding said lid are released, said means for holding said lid in said closed position thereof comprising a latch means, said latch means being actuable to release said lid by movement of said lid from said closed position thereof inwardly towards said enclosure, said hinge pin being secured to said enclosure by means that at least include means for varying the degree of twist in said hinge pin itself in said closed position of said lid.

9. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising first knuckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said closed position of said lid to lift said lid against the force of gravity when said means for holding said lid are released, said means for holding said lid in said closed position thereof comprising a latch means, said latch means being actuable to release said lid by movement of said lid from said closed position thereof inwardly towards said enclosure, said hinge pin being a rod having two aligned straight portions separated by a generally U-shaped bend, sets of said first and second knuckle means being secured to said lid and said enclosure respectively on opposite sides of said generally U-shaped bend, said straight portions each passing through a different one of said sets of said first and second knuckle means, said rod being secured to said enclosure at said generally U-shaped bend by means at least including means for varying the degree of twist in said hinge pin itself in said closed position of said lid.

10. In combination, an enclosure having an open top end, a lid for closing the open end of said enclosure and movable to an open position; means for holding said lid in a closed position over the open end of said enclosure; hinge means for hingedly connecting said lid to said enclosure, the hinge axis of said hinge means being substantially horizontal, whereby said lid is hinged to move in a substantially vertical plane, said hinge means comprising a first knuckle means secured to said lid, second knuckle means secured to said enclosure, and a hinge pin extending through said first and second knuckle means in engagement therewith, said hinge pin and said first and second knuckle means pivotably mounting said lid on said enclosure, said hinge pin itself being a torsion bar and itself being secured to said lid and to said enclosure at spaced-apart points for rendering said hinge pin itself twistable and untwistable between said points when said lid is pivoted about said hinge axis, said hinge pin itself being sufficiently twisted in said enclosed position of said lid to lift said lid against the force of gravity when said means for holding said lid are released, the torque of said hinge pin in said closed position of said lid being about 1.4 times the closing moment of said lid where the closing moment of said lid is the product of the weight of said lid and the shortest distance between said hinge axis and the centre of gravity of said lid measured along said lid, said means for holding said lid in said closed position thereof comprising latch means, said latch means being actuable to release said lid by movement of said lid from said closed position thereof inwardly towards said enclosure, said latch means comprising a catch mounted on said enclosure for movement in two substantially perpendicular planes, and a catch-engaging finger carried by said lid, said hinge pin being a rod having two aligned straight portions separated by a generally U-shaped bend and each having an end bent away from its respective straight portion, sets of said first and second knuckle means being secured to said lid and said enclosure respectively on opposite sides of said generally U-shaped bend, said straight portions each passing through a different one of said sets of said first and second knuckle means, said rod being secured to said enclosure at said generally U-shaped bend and being secured to said lid by having said bent ends of said rod inserted in openings in said lid, said rod being secured to said enclosure by means comprising a plate engageable with said generally U-shaped bend, and means carrying said plate and mounted on said enclosure for movement of said plate and said generally U-shaped bend towards and away from said enclosure.

References Cited by the Examiner

UNITED STATES PATENTS

| | | | |
|---|---|---|---|
| 822,555 | 6/1906 | Rogers | 16—180 |
| 2,602,957 | 7/1952 | Anderson | 16—180 X |
| 2,637,576 | 5/1953 | Nottingham | 292—99 |

References Cited by the Applicant

UNITED STATES PATENTS

| | | |
|---|---|---|
| 443,753 | 8/1947 | Bunker. |
| 647,936 | 9/1962 | Floehr. |

CLAUDE A. LE ROY, *Primary Examiner.*

CHANCELLOR E. HARRIS, *Examiner.*

F. DOMOTOR, *Assistant Examiner.*